United States Patent [19]

Yamada et al.

[11] Patent Number: 4,788,018

[45] Date of Patent: Nov. 29, 1988

[54] METHOD FOR PRODUCING HIGH-DENSITY SINTERED SILICON CARBIDE ARTICLES

[75] Inventors: Koichi Yamada; Masahide Mouri, both of Niihama, Japan

[73] Assignee: Sumitomo Chemical Company, Limited, Osaka, Japan

[21] Appl. No.: 925,919

[22] Filed: Nov. 3, 1986

[30] Foreign Application Priority Data

Aug. 29, 1986 [JP] Japan .................... 61-204831

[51] Int. Cl.$^4$ ............................ C04B 35/56
[52] U.S. Cl. ......................... 264/63; 264/65; 264/66
[58] Field of Search ............. 264/65, 66, 63

[56] References Cited

U.S. PATENT DOCUMENTS

| | | | |
|---|---|---|---|
| 4,124,667 | 11/1978 | Coppola et al. | 264/65 |
| 4,237,085 | 12/1980 | Smoak | 264/65 |
| 4,312,954 | 1/1982 | Coppola et al. | 501/90 |
| 4,318,876 | 3/1982 | Broussaud . | |
| 4,336,216 | 6/1982 | Watanabe et al. | 264/66 |
| 4,455,385 | 6/1984 | Prochazka . | |
| 4,562,040 | 12/1985 | Yamada et al. | 419/23 |
| 4,579,704 | 4/1986 | Tanaka et al. | 264/65 |
| 4,668,452 | 5/1987 | Watanabe et al. | 264/66 |

FOREIGN PATENT DOCUMENTS

| | | |
|---|---|---|
| 0159186 | 10/1985 | European Pat. Off. . |
| 0157586 | 10/1985 | European Pat. Off. . |
| 51-148712 | 12/1976 | Japan . |
| 59-184769 | 10/1984 | Japan . |
| 60-155573 | 8/1985 | Japan . |
| 60-186467 | 9/1985 | Japan . |
| 60-200861 | 10/1985 | Japan . |
| 61-58862 | 3/1986 | Japan . |

*Primary Examiner*—James Derrington
*Attorney, Agent, or Firm*—Stevens, Davis, Miller & Mosher

[57] ABSTRACT

A method for producing high-density sintered silicon carbide articles useful as wear-resistant materials, corrosion-resistant materials and high-temperature structural materials which comprises mixing powdery silicon carbide composed mainly of α-phase silicon carbide, a boron compound of from about 0.05 to about 0.15 wt. %, as converted to boron, based thereon and a carbonizable organic substance so that the total of combinable carbon content of the powdery silicon carbide and combinable carbon content of the carbonizable organic substance is from about 4 to about 8 wt. %, molding the resulting mixture, and subjecting the molded product to heating at a temperature of from about 1,000° C. to about 2,000° C. in a vacuum and then sintering at a temperature of about 2,300° C. or less in an inert atmosphere to obtain a sintered silicon carbide article having a sintered density of about 90% or more of the theoretical density.

10 Claims, No Drawings

METHOD FOR PRODUCING HIGH-DENSITY SINTERED SILICON CARBIDE ARTICLES

The present invention relates to a method for producing sintered silicon carbide articles, and more particularly, to a method for producing high-density sintered silicon carbide articles which comprises incorporating particular amounts of a carbonaceous substance and a boron compound, which are a densification aid, in powdery silicon carbide and molding the resulting mixture, after which the molded product is heated in a vacuum and then sintered in an inert atmosphere.

Silicon carbide has excellent physical and chemical properties, and particularly, it has high hardness and chemical stability and besides, its mechanical properties, even at high temperatures exceeding 1,000° C., do not change from those at room temperature, so that it has been regarded as promising as wear-resistant materials, corrosion-resistant materials and high-temperature structural materials.

However, sintering of silicon carbide is so much difficult that it is difficult to sinter silicon carbide in high density by the usual methods, and therefore, sintering by the hot press method, sintering with densification aids, etc. have been proposed.

For example, Japanese Patent Application Kokai (Laid-open) No. 148,712/1976 discloses that high-density sintered silicon carbide articles are obtained by mixing 91 to 99.35 parts by weight of silicon carbide having a specific surface area of 1 to 100 m²g and containing at least 5 wt. % or more of $\alpha$-phase silicon carbide, 0.67 to 20 parts by weight of a carbonizable, organic solvent-soluble organic material having a carbonization ratio of 25 to 75 wt. %, a boron source containing 0.15 to 3.0 parts by weight of boron and 5 to 15 parts by weight of a temporary binding agent, and sintering the resulting mixture.

This method surely produces high-density sintered silicon carbide articles, but they are not satisfactory in mechanical strength. For example, no articles having a bending strength exceeding 50 kg/mm² are obtained.

In order to solve this problem, the present inventors previously found that sintered articles of excellent mechanical strength can be obtained without reducing the sintered density by using in combination a particular amount of a particular carbonaceous substance and boron which is less in amount than that so far generally regarded as necessary to raise the sintered density in the case of silicon carbide, and applied for a patent, Japanese Patent Application No. 57,584/1984 [Japanese Patent Application Kokai (Laid-open) No. 200,861/1985].

In the above method, however, there is a problem that a particular carbonaceous substance should be used. The present inventors, therefore, made a further study and as a result, found that when calcination and sintering of the molded product obtained are carried out under particular conditions, sintered silicon carbide articles of high density, high strength and high hardness can be obtained without a necessity to use any particular carbonaceous substance. The present inventors thus completed the present invention.

The present invention provides a method for producing high-density sintered silicon carbide articles characterized in that powdery silicon carbide composed mainly of $\alpha$-phase silicon carbide, a boron compound of from about 0.05 to about 0.15 wt. %, as converted to boron, based thereon and a carbonizable organic substance are mixed so that the total of the combinable carbon content of the powdery silicon carbide and the combinable carbon content of the carbonizable organic substance is from about 4 to about 8 wt. %, the resulting mixture is molded and the molded product is heated in a vacuum at a temperature of from about 1,000° C. to about 2,000° C. and then sintered in an inert atmosphere at a temperature of about 2,300° C. or less to obtain a sintered silicon carbide article having a sintered density of about 90% or more of the theoretical density.

The method of the present invention will be explained in more detail.

Preferred powdery silicon carbide used in the method of the present invention is one consisting mainly of silicon carbide of about 1 $\mu$m or less in average particle diameter having an $\alpha$-phase, namely, a crystal structure of non-cubic polytypes. It is also possible, however, to mix $\beta$-phase powdery silicon carbide with the $\alpha$-phase one if the former amount is up to about 30 wt. % of the latter amount.

Generally, silicon carbide contains from about 0.2 to about 2.0 wt. % of combinable carbon, and this is also the same with the powdery silicon carbide used in the present invention.

In the present invention, the amount of the boron compound incorporated is from about 0.05 to about 0.15 wt. %, preferably from about 0.08 to about 0.13 wt. %, as converted to boron, based on the powdery silicon carbide. The amount of the carbonizable organic substance incorporated is from about 4 to about 8 wt. %, preferably from about 4.5 to about 6 wt. %, as expressed by total of combinable carbon content of the powdery silicon carbide and combinable carbon content of the carbonizable organic substance. The combinable carbon content of the carbonizable organic substance is an amount expressed by a carbonization ratio which the organic substance possesses. When the amount of the boron compound added is less than about 0.05 wt. %, as converted to born, based on the powdery silicon carbide, high-density sintered articles are difficult to obtain. While when the amount exceeds about 0.15 wt. %, coarse grains are easy to grow in the sintered articles depending upon the sintering temperature and time, thereby lowering the mechanical strength of the articles.

When the amount of the carbonizable organic substance is less than about 4 wt. % based on the powdery silicon carbide, as expressed by the total of the combinable carbon content of the powdery silicon carbide and the combinable carbon content of the carbonizable organic substance, high-density sintered articles cannot be obtained. While when the amount exceeds about 8 wt. %, the mechanical strength of the sintered articles lowers, which is not preferred.

There is no particular limitation to the boron compound usable in practicing the present invention, but generally, those which remain stable up to the sintering temperature for the sintered articles aimed at, and besides have a high boron content are preferred. Specifically, there may be mentioned boron, boron carbide, etc.

The carbonizable organic substance may be any of organic solvent-soluble organic materials having a carbonization ratio of 30 wt. % or more, preferably 40 to 60 wt. %. For example, there may be mentioned synthetic resins such as phenol resins, furan resins, resorcinol resins, aniline resins, cresol resins, polyimide, polyacrylonitrile, polyphenylene, polymethylphenylene, etc., and tar pitches such as coal tar pitch, oil tar pitch, etc.

In the present invention, for producing molded products of a mixture of the powdery silicon carbide, boron compound and carbonizable organic substance blended in the proportion as shown above, the following method will suffice: The mixture is uniformly mixed with an organic solvent (e.g. benzene, quinoline, acetone) and/or water and (i) molded by slip casting, or (ii) granulated by spray drying and molded under pressure on a press, or (iii) mixed with an organic binder and molded by extrusion molding, injection molding, etc.

The molded product thus obtained, after subjected to machining or to treating the removal of binder if necessary, is heated to a temperature of about 1,000° C. or higher, preferably about 1,500° C. or higher in a vacuum, and then sintered at a temperature of about 2,300° C. or less in an inert atmosphere such as argon, helium, nitrogen, etc.

The degree of vacuum is not particularly limited so far as the pyrolysis of the carbonizable organic substance is carried out uniformly and sufficiently, and it is generally about 10 Torr or higher, preferably about $10^{-1}$ Torr or higher, more preferably from about $10^{-1}$ to about $10^{-6}$ Torr.

In the method of the present invention, when the heating temperature in a vacuum is lower than about 1,000° C., pyrolysis of the carbonizable organic substance is not sufficient. While when it exceeds about 2,000° C., with sintering furnaces made of graphite heaters and refractory which are commonly used in industry, the durability of the heaters and refractory becomes a problem, which is not preferred.

The sintering temperature is about 2,300° C. or less. When it exceeds 2,300° C., no advantages are found in raising the density of sintered articles, and besides pyrolysis of silicon carbide takes place, which is not preferred. While when the sintering temperature is about 2,000° C. or less, high-density sintered articles are not sometimes obtained. A preferred sintering temperature is therefore from about 2,050° C. to about 2,250° C.

The temperature and time required for heating in a vacuum prior to sintering in an inert atmosphere depend upon the carbon content of the molded products and the degree of vacuum applied, so that they cannot be determined unconditionally. Generally, however, there may be employed a method in which heating is carried out while raising the temperature from room temperature to from about 1,500° C. to about 2,000° C. over from about 1 to about 10 hours under a vacuum of from about $10^{-1}$ to about $10^{-3}$ Torr, and then sintering is carried out in an inert atmosphere.

A reason why high-density sintered silicon carbide articles are obtained in the present invention is not clear, but it may be considered that, by evacuating the atmosphere at a temperature of 1,000° C. or less at which pyrolysis of the carbonizable organic substance takes place, carbon produced by the pyrolysis has a favorable structure to promote sintering.

Further, the evacuated atmosphere may be considered to act favorably at a temperature of 1,000° C. or higher in removing the oxide layer from the surface of silicon carbide powders.

This effect acts more effectively with an increasing temperature in a range of up to about 1,800° C. at which sintering begins to proceed. Also, the hardness of sintered articles obtained by sintering according to the present invention is higher than that of sintered articles subjected to no treatment under vacuum.

The reason for this is not also clear, but the hardness of sintered articles may be considered to become high for the following reasons: The treatment under vacuum promotes the decomposition of the carbonizable organic substance to reduce the amount of residual carbon in the sintered articles and besides creates a state in which residual fine carbon particles have uniformly been dispersed within the sintered articles.

The content of residual boron in the sintered articles of the present invention is from about 0.03 to about 0.15 wt. %, preferably from about 0.07 to about 0.11 wt. %. When the content is less than about 0.03 wt. %, high-density sintered articles cannot be obtained. While when it exceeds about 0.15 wt. %, the mechanical strength of the sintered articles lowers.

The physical properties of the sintered articles are substantially determined by the powdery silicon carbide and the boron and carbonaceous compounds to be added thereto, but minute control by operation conditions is also possible.

According to the method of the present invention described above in detail, by employing a two-stage heating schedule in which particular amounts of the carbonaceous compound and boron compound are incorporated as densification aids in the powdery silicon carbide, the resulting mixture is molded and the molded product is heated in a vacuum to a particular temperature or higher and subsequently sintered in an inert atmosphere, it became possible to obtain high-density sintered silicon carbide articles of excellent mechanical strength and hardness having a boron content of from more than 0.03 wt. % to less than 0.15 wt. % and a density of 90% or more, generally 95% or more of the theoretical density. The method of the present invention for producing high-density sintered silicon carbide articles is of a very high industrial value to produce industrial materials such as turbine blades, pump parts, papermaking machine parts, etc.

The present invention will be illustrated in more detail with reference to the following examples.

EXAMPLE 1

After dissolving 17 g of coal tar pitch (carbonization ratio, 53%) in 17 g of quinoline, 400 g of benzene was added, followed by thorough mixing. To the resulting solution were added 200 g of α-phase silicon carbide containing 0.34 wt. % of combinable carbon and having a silicon carbide content of 98% and a BET specific surface area of 10 m²/g (UF-10 ®; a product of Lonza, Ltd.) and 0.3 g of boron carbide of 1200-mesh through (Denka Boron ®; a product of Denki Kagaku Kogyo Co.), and the mixture was milled and mixed for 3 hours by means of a plastic ball mill. The mixture was then dried at 60° C. in a nitrogen gas stream, crushed and passed through a 180-mesh sieve. The mixed powder obtained was cold-pressed, charged in a rubber mold and molded on a hydrostatic pressure press under a molding pressure of 1.5 tons/cm² to obtain a molded product of 50 mm×35mm×5 mm.

This molded product was heated, under a vacuum of from $10^{-3}$ to $10^{-4}$ Torr, from room temperature to 600° C. at a rate of 100° C./hour and then from 600° C. to 1,800° C. at a rate of 400° C./hour, after which an argon gas was introduced while maintaining the temperature at 1,800° C. for 30 minutes. After the pressure reached 760 Torr, sintering was carried out at a temperature of 2,125° C. for 2 hours in an argon gas atmosphere. The resulting sintered article had the following physical properties: Sintered density, 3.17 g/cm$^3$; bending strength by the three-point bending test (sample size, 4 mm×3mm×50 mm; span, 30 mm), 64 kg/mm$^2$; and micro vickers hardness (load, 1 kg×15 sec), 2390 kg/mm$^2$. The residual boron content of this sintered article was 0.09 wt. %.

EXAMPLE 2

After dissolving 16 g of oil tar pitch (carbonization ratio, 55%) in 16 g of quinoline, 400 g of benzene was added, followed by thorough mixing. To the resulting solution were added 200 g of α-phase silicon carbide containing 0.34 wt. % of combinable carbon and having a silicon carbide content of 98% and a BET specific surface area of 10 m$^2$/g and 0.3 g of boron carbide of 1200-mesh through, and the mixture was milled and mixed for 3 hours by means of a plastic ball mill. The mixture was then dried at 60° C. in a nitrogen gas stream, crushed and passed through a 180-mesh sieve. The mixed powder obtained was cold-pressed, charged in a rubber mold and molded on a hydrostatic pressure press under a molding pressure of 1.5 tons/cm$^2$ to obtain a molded product of 50mm×35mm×5 mm.

This molded product was heated, under a vacuum of from 10$^{-3}$ to 10$^{-4}$ Torr, from room temperature to 600° C. at a rate of 100° C./hour and then from 600° C. to 1,800° C. at a rate of 400° C./hour, after which an argon gas was introduced while maintaining the temperature at 1,800° C. for 30 minutes. After the pressure reached 760 Torr, sintering was carried out at a temperature of 2,125° C. for 2 hours in an argon gas atmosphere. The resulting sintered article had the following physical properties: Sintered density, 3.08 g/cm$^3$; three-point bending strength, 58 kg/mm$^2$; and micro vickers hardness, 2,300 kg/mm$^2$. The residual boron content of this sintered article was 0.09 wt. %.

EXAMPLE 3

Eleven grams of a liquid novolak type phenol resin (Sumilite Resin ® PR-940C; a product of Sumitomo Bakelite Co.; carbonization ratio, 41%), 10 g of 10 wt. % aqueous polyvinyl alcohol solution (Kurare Poval ® 205; a product of Kurare Co.), 190 cc of water, 100 g of α-phase silicon carbide containing 0.34 wt. % of combinable carbon and having a silicon carbide content of 98% and a BET specific surface area of 10 m$^2$/g (UF-10®; a product of Lonza, Ltd.) and 0.15 g of boron carbide of 1200-mesh through (Denka Boron ®; a product of Denki Kagaku Kogyo Co.) were added to a plastic ball mill and milled and mixed for 3 hours.

The resulting mixture was dried at 60° C. in a nitrogen gas stream, crushed and passed through a 180-mesh sieve. The mixed powder obtained was cold-pressed, charged in a rubber mold and molded on a hydrostatic pressure press under a molding pressure of 1.5 tons/cm$^2$ to obtain a molded product of 50 mm×35 mm×5 mm.

This molded product was heated, under a vacuum of from 10$^{-2}$ to 10$^{-3}$ Torr, from room temperature to 600° C. at a rate of 100° C./hour and then from 600° C. to 1,800° C. at a rate of 400° C./hour, after which an argon gas was introduced while maintaining the temperature at 1,800° C. for 30 minutes.

After the pressure reached 760 Torr, the temperature was further raised to 2,125° C. at a rate of 50° C./hour in an argon gas atmosphere, after which sintering was carried out at a temperature of 2,125° C. for 2 hours.

The resulting sintered article had the following physical properties: Sintered density, 3.17 g/cm$^3$; bending strength by the three-point bending test (sample size, 4 mm×3 mm×40 mm; span, 30 mm), 60 kg/mm$^2$; and micro vickers hardness (load, 1 kg×15 sec), 2460 kg/mm$^2$. This sintered article had a resiual boron content of 0.08 wt. %, and its structure was found to be uniform microscopically.

EXAMPLE 4

Preparation, calcination and sintering of the molded product were carried out in the same condition as in Example 1 except that the amount of the α-phase powdery silicon carbide was decreased to 75 parts by weight, and that 25 parts by weight of β-phase powdery silicon carbide containing 0.59 wt. % of uncombined carbon and having a silicon carbide content of 98% and a BET specific surface area of 20 m$^2$/g (Beta-rundum Ultrafine ®; a product of Ibiden Co.) was used.

The resulting sintered article had the following physical properties: Sintered density, 3.14 g/cm$^3$; bending strength, 55 kg/mm$^2$; and micro vickers hardness, 2380 kg/mm$^2$. The residual boron content of this sintered article was 0.08 wt. %.

COMPARATIVE EXAMPLE 1

A molded product prepared in the same condition as in Example 1 was calcined at a temperature of 600° C. for 3 hours in an argon gas stream, and then sintered at a temperature of 2,125° C. for 2 hours in an argon gas atmosphere. The resulting sintered article had the following physical properties: Sintered density, 3.10 g/cm$^3$; bending strength, 58 kg/mm$^2$; and micro vickers hardness, 2070 kg/mm$^2$. The residual boron content of this sintered article was 0.09 wt. %.

COMPARATIVE EXAMPLE 2

A molded product prepared in the same condition as in Example 3 was directly calcined at a temperature of 600° C. for 3 hours in an argon gas stream without subjecting to calcination in a vacuum, and then sintered at a temperature of 2,125° C. for 2 hours in an argon gas atmosphere.

The resulting sintered article had the following physical properties: Sintered density, 2.85 g/cm$^3$; bending strength, 27 kg/mm$^2$; and micro vickers hardness, 1900 kg/mm$^2$. The residual boron content of this sintered article was 0.08 wt. %.

EXAMPLES 5 TO 10 AND COMPARATIVE EXAMPLES 3 TO 8

Preparation, calcination and sintering of the molded product were carried out in the same manner as in Example 1 except that conditions shown in Tables 1 and 2 were used, and the resulting sintered articles were measured for the physical properties. The results are shown in Tables 1 and 2.

The size of the molded product was 50 mm× 35 mm×4 mm except Example 9 and Comparative example 8 wherein it was 50 mm×35 mm×10 mm.

The temperature was raised at the following rates: From room temperature to 600° C., 100° C./hour; from 600° C. to 1,800° C., 400° C./hour; and from 1,800° C. to sintering temperature, 50° C./hour.

In Example 8, 0.5 g of silicon having an average particle diameter of 3 μm was additionally added to the powdery silicon carbide.

In Example 10, a mixture of 75 wt. % of α-phase powdery silicon carbide and 25 wt. % of β-phase powdery silicon carbide, the both being the same as those used in Example 4, was used as a material.

EXAMPLES 11 TO 16

Preparation, calcination and sintering of the molded product were carried out in the same manner as in Example 3 except that conditions shown in Table 3 were used, and the resulting sintered articles were measured for the physical properties. The results are shown in Table 3.

COMPARATIVE EXAMPLES 9 TO 14

Preparation, calcination and sintering of the molded product were carried out in the same manner as in Example 3 except that conditions shown in Table 4 were used, and the resulting sintered articles were measured for the physical properties. The results are shown in Table 4.

TABLE 1

| | Boron carbide (parts by weight) | Coal tar pitch (parts by weight) | Sintering condition Vacuum | Sintering condition Argon atmosphere | Sintered density (g/cm³) | Bending strength (kg/mm²) | Residual boron content (wt. %) | Hardness (kg/mm²) | Micro structure |
|---|---|---|---|---|---|---|---|---|---|
| Example 5 | 0.15 | 8.5 | 1800° C. | 2200° C. × 2 hr | 3.18 | 63 | 0.08 | 2380 | Normal grain growth |
| Example 6 | 0.15 | 12.0 | 1800° C. | 2125° C. × 2 hr | 3.15 | 56 | 0.09 | 2330 | " |
| Example 7 | 0.15 | 8.5 | 1300° C. | 2125° C. × 2 hr | 3.11 | 56 | 0.07 | 2320 | " |
| Example 8 | 0.15 | 8.5 | 1800° C. | 2125° C. × 2 hr | 3.18 | 65 | 0.09 | 2420 | " |
| Example 9 | 0.15 | 8.5 | 1800° C. | 2125° C. × 2 hr | 3.18 | 63 | 0.09 | 2350 | " |
| Example 10 | 0.15 | 8.5 | 1800° C. | 2200° C. × 2 hr | 3.17 | 62 | 0.08 | 2400 | " |

TABLE 2

| | Boron carbide (parts by weight) | Coal tar pitch (parts by weight) | Sintering condition Vacuum | Sintering condition Argon atmosphere | Sintered density (g/cm³) | Bending strength (kg/mm²) | Residual boron content (wt. %) | Hardness (kg/mm²) | Micro structure |
|---|---|---|---|---|---|---|---|---|---|
| Comparative example 3 | 0.5 | 8.5 | 1800° C. | 2125° C. × 2 hr | 3.18 | 48 | 0.36 | 2260 | Normal grain growth |
| Comparative example 4 | 0.5 | 8.5 | 1800° C. | 2200° C. × 2 hr | 3.17 | 35 | 0.31 | 2290 | Exaggerated grain growth |
| Comparative example 5 | 0.5 | 6.0 | — | 2125° C. × 2 hr | 3.15 | 45 | 0.28 | 2060 | Normal grain growth |
| Comparative example 6 | 0.15 | 3.9 | 1800° C. | 2125° C. × 2 hr | 1.76 | — | 0.08 | — | " |
| Comparative example 7 | 0.15 | 18.0 | 1800° C. | 2125° C. × 2 hr | 3.02 | 45 | 0.09 | 1900 | " |
| Comparative example 8 | 0.15 | 8.5 | — | 2125° C. × 2 hr | 2.98 | 42 | 0.09 | 1950 | " |

TABLE 3

| | Boron carbide (parts by weight) | Phenol resin (parts by weight) | Sintering condition Vacuum | Sintering condition Argon atmosphere | Sintered density (g/cm³) | Bending strength (kg/mm²) | Residual boron content (wt. %) | Hardness (kg/mm²) | Micro structure |
|---|---|---|---|---|---|---|---|---|---|
| Example 11 | 0.15 | 11.0 | 1800° C. | 2200° C. × 2 hr | 3.18 | 57 | 0.07 | 2480 | Normal grain growth |
| Example 12 | 0.12 | 11.0 | 1800° C. | 2125° C. × 2 hr | 3.07 | 55 | 0.07 | 2350 | " |
| Example 13 | 0.15 | 11.0 | 1800° C. | 2125° C. × 2 hr | 3.17 | 60 | 0.08 | 2470 | " |
| Example 14 | 0.10 | 11.0 | 1800° C. | 2200° C. × 2 hr | 3.07 | 55 | 0.06 | 2370 | " |
| Example 15 | 0.15 | 16.0 | 1800° C. | 2125° C. × 2 hr | 3.15 | 57 | 0.08 | 2400 | " |
| Example 16 | 0.15 | 11.0 | 1300° C. | 2125° C. × 2 hr | 3.10 | 56 | 0.08 | 2400 | " |

TABLE 4

| | Boron carbide (parts by weight) | Phenol resin (parts by weight) | Sintering condition Vacuum | Sintering condition Argon atmosphere | Sintered density (g/cm³) | Bending strength (kg/mm²) | Residual boron content (wt. %) | Hardness (kg/mm²) | Micro structure |
|---|---|---|---|---|---|---|---|---|---|
| Comparative example 9 | 0.15 | 20.0 | 1800° C. | 2125° C. × 2 hr | 2.80 | — | 0.09 | 1850 | Normal grain growth, porous |
| Comparative example 10 | 0.39 | 5.1 | 1800° C. | 2200° C. × 2 hr | 3.19 | 50 | 0.26 | 2450 | Exaggerated grain growth |
| Comparative example 11 | 0.04 | 11.0 | 1800° C. | 2125° C. × 2 hr | 2.65 | — | 0.02 | Immeasurable | Normal grain growth, porous |
| Comparative example 12 | 0.50 | 6.4 | 1800° C. | 2200° C. × 2 hr | 3.18 | 47 | 0.31 | 2400 | Exaggerated grain growth |
| Comparative example 13 | 0.15 | 6.4 | 1800° C. | 2125° C. × 2 hr | 2.85 | — | 0.08 | 1950 | Normal grain growth |
| Comparative | 0.39 | 11.0 | 1800° C. | 2200° C. × 2 hr | 3.16 | 48 | 0.32 | 2330 | Exaggerated |

TABLE 4-continued

| Boron carbide (parts by weight) | Phenol resin (parts by weight) | Sintering condition | | Sintered density (g/cm³) | Bending strength (kg/mm²) | Residual boron content (wt. %) | Hardness (kg/mm²) | Micro structure |
| --- | --- | --- | --- | --- | --- | --- | --- | --- |
| | | Vacuum | Argon atmosphere | | | | | |
| example 14 | | | | | | | | grain growth |

What is claimed is:

1. A method for producing high-density sintered silicon carbide articles which comprises mixing powdery silicon carbide composed mainly of α-phase silicon carbide, a boron compound of from about 0.05 to about 0.15 wt. %, as converted to boron, based thereon and a carbonizable organic substance so that total of combinable carbon content of the powdery silicon carbide and combinable carbon content of the carbonizable organic substance is from about 4 to about 8 wt. %, molding the resulting mixture, and subjecting the molded product to heating at a temperature of from about 1,000° C. to about 2,000° C. in a vacuum and then sintering at a temperature of about 2,300° C. or less in an inert atmosphere to obtain a sintered silicon carbide article having a sintered density of about 90% or more of the theoretical density.

2. A method according to claim 1, wherein the powdery silicon carbide composed mainly of α-phase silicon carbide has an average particle diameter of about 1 μm or less.

3. A method according to claim 1, wherein the powdery silicon carbide composed mainly of α-phase silicon carbide contains up to about 30 wt. % of β-phase powdery silicon carbide.

4. A method according to claim 1, wherein the amount of the boron compound to be added to the powdery silicon carbide composed mainly of α-phase silicon carbide is from about 0.08 to about 0.13 wt. %, as converted to boron.

5. A method according to claim 1, wherein the amount of the carbonizable organic substance to be added to the powdery silicon carbide composed mainly of α-phase silicon carbide is from about 4.5 to about 6 wt. %, as expressed by total of combinable carbon content of the powdery silicon carbide and combinable carbon content of the carbonizable organic substance.

6. A method according to claim 1, wherein the carbonizable organic substance is oil tar pitch and/or coal tar pitch.

7. A method according to claim 1, wherein the carbonizable organic substance is a phenol resin.

8. A method according to claim 1, wherein the inert atmosphere is composed of argon, helium or nitrogen.

9. A method according to claim 1, wherein the sintering of the molded product is carried out in a vacuum of from about $10^{-1}$ to about $10^{-3}$ Torr while raising the temperature from room temperature to from about 1,500° C. to about 2,000° C. over from about 1 to about 10 hours, and then at a temperature of about 2,300° C. or less in an inert atmosphere.

10. A method according to claim 1, wherein the boron content of the sintered article is from about 0.03 to about 0.15 wt. %.

* * * * *